United States Patent Office 3,548,007
Patented Dec. 15, 1970

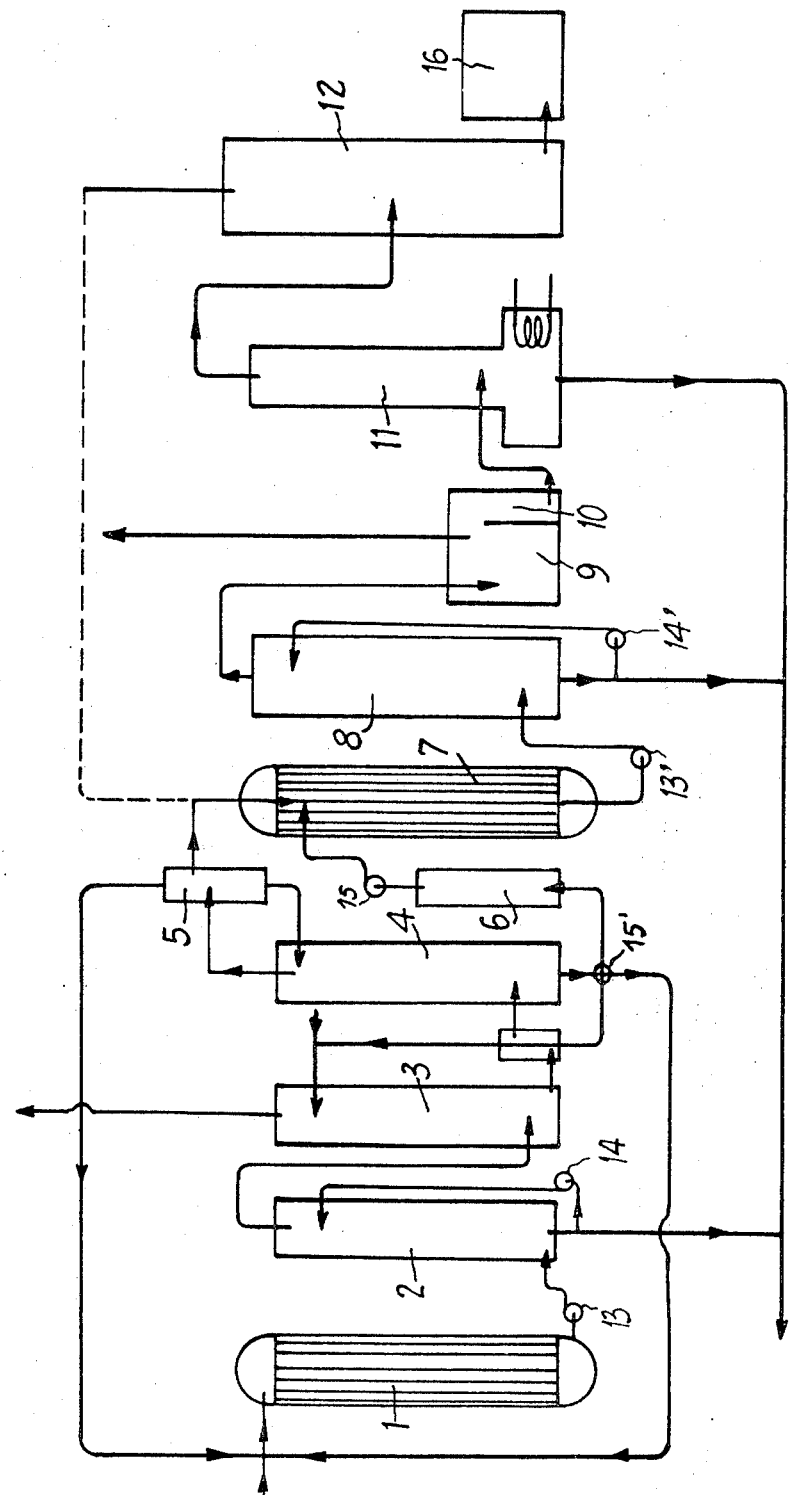

3,548,007
PRODUCTION OF DIMETHYL SULFIDE
Michel Comte, Arthez de Bearn, France, assignor to Societe Nationale des Petroles d'Aquitaine, Courbevoie, France
Filed Dec. 18, 1967, Ser. No. 691,426
Claims priority, application France, Dec. 21, 1966, 88,330
Int. Cl. C07c 149/6
U.S. Cl. 260—609                                       3 Claims

ABSTRACT OF THE DISCLOSURE

This invention relates to a process and apparatus for manufacturing dimethyl sufide and, more particularly, to a method of producing dimethyl sulfide by reacting methanol with $H_2S$ and then again methanol with the methyl mercaptan thus formed, and by controlling the proportion of methanol so as to have no more than 5 moles percent of methyl mercaptan in the final crude product obtained after the above second reaction.

BACKGROUND OF THE INVENTION

The well-known substance dimethyl sulfide (DMS) has numerous uses; it is of particular importance as an intermediary in the preparation of dimethyl sulphoxide. The present invention relates to a process for the preparation of dimethyl sulphide from methyl alcohol and hydrogen sulphide; it also relates to apparatus for carrying this process into effect.

Hydrogen sulphide and methyl alcohol, in the presence of appropriate catalysts, give rise to the following reversible reactions:

(1) $\quad CH_3OH + H_2S \rightleftharpoons CH_3SH + H_2O$
(2) $\quad 2CH_3OH + H_2S \rightleftharpoons CH_3SCH_3 + 2H_2O$
(3) $\quad CH_3OH + CH_3SH \rightleftharpoons CH_3SCH_3 + H_2O$
(4) $\quad 2CH_3SH \rightleftharpoons CH_3SCH_3 + H_2S$ Thus, when hydrogen sulphide and methyl alcohol are reacted, dimethyl mercaptan and dimethyl sulphide are always both present.

By raising the reaction temperature, in the presence of an appropriate catalyst and/or with an excess of one of the reactants, it is possible to assist those reactions which result in the production of dimethyl sulphide.

Dimethyl sulphide can be prepared in two stages, starting with hydrogen sulphide and methanol, methyl mercaptan being formed in one of the stages (1), while the methyl mercaptan is transformed into dimethyl sulphide in the other stage (3). Nevertheless, after these two stages, a considerable quantity of methyl mercaptan still remains in addition to the dimethyl sulphide. Moreover, it is necessary to provide an arrangement for the separation of the methyl mercaptan, such arrangement generally being situated after the apparatus for purification of the dimethyl sulphide. Thus, before the methyl mercaptan which is present is recycled, it passes through the whole purification system, and this is not economical, either from the thermal point of view or as regards the dimensions of the necessary equipment. Furthermore, at the time when the methyl mercaptan is separated, large quantities of purified dimethyl sulphide are entrained by the methyl mercaptan and are thus lost from the point of view of production.

It is highly desirable to keep constant the ratio of the products which enter the reaction vessel in which the second working stage is carried out, in order to control the rate of transformation of the methyl mercaptan into dimethyl sulphide; however, this is very difficult because the concentrations of the products leaving the first reaction vessel and entering the second reaction vessel are extremely variable. These and other difficulties experienced with the prior art devices have been obviated in a novel manner by the present invention.

It is, therefore, an outstanding object of the invention to provide a process and apparatus for the manufacture of dimethyl sulfide, wherein the product can be obtained practically free of methyl mercaptan after the second stage of a two-stage process.

Another object of this invention is the provision of a two-step method for producing dimethyl sulfide wherein the concentrations of the products leaving the first step are maintained at a constant, predetermined value.

A further object of the present invention is the provision of a two-step method for manufacturing dimethyl sulfide having a high yield.

It is another object of the instant invention to provide a method for producing methyl sulfide, wherein by constant control of the proportions of the products entering the first reaction vessel of a two-stage process, it is possible for a preponderant amount of methyl mercaptan to be produced therein.

A still further object of the invention is the provision of a method for producing methyl sulfide, wherein the proportions of the reactants are made practically constant by suitable control of the compositions of the products entering the second reaction vessel; it thus becomes possible always to operate under the same reaction conditions with the same advantage achieved as with regard to the first reaction vessel.

SUMMARY OF THE INVENTION

In general, the present invention relates to the manufacture of dimethyl sulfide in two steps, namely, a first stage involving the reaction of methanol with hydrogen sulfide to produce methyl mercaptan and a second stage involving the conversion of the mercaptan into methyl sulfide by treating it with methanol, wherein the proportion of methanol introduced in the second stage is controlled to a value such that the reaction product of the second stage does not contain more than 5 mole percent of methyl mercaptan. Furthermore, the invention relates to apparatus for the manufacture of dimethyl sulfide from methanol and hydrogen sulfide, comprising a primary reaction vessel for carrying out a first working stage for the production of methyl mercaptan, apparatus for washing, absorbing, and separating materials originating in the first stage, a secondary reaction vessel for carrying out a second working stage involving the conversion of methyl mercaptan into dimethyl sulfide under the action of methanol, and equipment for regulating the quantity of methanol which reaches the secondary reaction vessel in response to variations in the composition of the streams of methanol and methyl mercaptan, respectively, which are supplied to the secondary vessel from the first working stage and are charged with impurities originating from the first working stage.

BRIEF DESCRIPTION OF THE DRAWING

The character of the invention, however, may be best understood by reference to one of its structural forms, as illustrated by the accompanying drawing in which:

The single figure of drawings shows a schematic view of apparatus embodying the principles of the present invention.

DESCRIPTION OF THE PREFERRED EMBODIMENT

The process according to the invention for the manufacture of dimethyl sulfide consists of two stages, the first of which comprises reacting methanol with hydrogen sulfide, giving methyl mercaptan, and the second of which comprises the transformation of the methyl mercaptan into dimethyl sulfide under the action of methanol, the proportion of methanol in the second stage being regulated to a value such that the reaction product of the second stage does not contain more than 5 mol percent of methyl mercaptan.

When working under these conditions, the mixture of dimethyl sulfide and methyl mercaptan which is obtained after the purification cycle subsequent to the second stage contains only very small amounts of methyl mercaptan. Also, at the time of the final separation, in which the methyl mercaptan is separated from the dimethyl sulfide, the methyl mercaptan entrains approximately its own weight of dimethyl sulfide, so that the proportion of the latter which is entrained is itself small and generally smaller smaller than 2% of the final production.

Preferably, the admission of methyl alcohol into the reaction zone of the second working stage is conducted in such a way that there are always at most 3 mol percent of methyl mercaptan in the resulting product.

According to one particular feature of the invention, a large part of the methanol employed in the second stage originates from a portion of methanol which has served for absorbing, at low temperature, the products formed during the first working stage. This portion is previously freed from the major part of the lightest thio-compounds which it contained after the aforementioned absorption. Nevertheless, it still contains a certain proportion of methyl mercaptan, dimethyl sulfidie and water.

According to another feature of the new process, the methyl mercaptan which is used in the second stage is derived in the form of a light fraction obtained by the separation of the methanol which contained the products formed during the first stage. The said fraction, comprising for the major part methyl mercaptan, also contains a little dimethyl sulfide, methanol, hydrogen sulfide and water, and possibly a small proportion of impurities. Thus, a certain part of the crude methanol is admitted into the second working stage in admixture with the crude methyl mercaptan.

In one embodiment of the invention which is of particular interest from the industrial viewpoint, the regulation of the proportion of methanol in the second stage influences the portion of this alcohol which originates from the absorption of the products formed during the first stage, as indicated above. It is the quantity of this portion which is regulated, relatively to the quantity of the aforementioned fraction of high methyl mercaptan content, in such a way that not more than 5 mol percent of methyl mercaptan remain in the products resulting from the second working stage.

According to another feature of the process of the invention, a part of the portion of methanol which serves to absorb, at low temperature, the products formed during the first working stage is provided by a stream of fresh methanol; the other part is derived from the portion which freed from the major part of the lightest sulfur compounds which it contained after the aforementioned absorption.

Preferably, in one form of the invention which is of particular interest from an industrial point of view, the methanol, enriched with sulfur compounds, is separated into a fraction with a high content of methyl mercaptan and into a fraction with a high content of methanol containing the major part of the dimethyl sulfide. The said fraction with a high content of methyl mercaptan is degasified prior to its entry into the second stage; on the other hand, the fraction with a high methanol content is partially recycled to the zone in which the first working stage takes place and partially to the zone in which the second stage takes place, the remainder being brought to the absorption zone in order to absorb the products formed during the first stage.

According to another preferred feature of the invention, the proportion of crude methanol recycled to the first zone is determined in such a way as to assist the formation of methyl mercaptan in this first zone.

In the case of any given catalyst and any given temperature, in order to carry the invention into effect, it is necessary to use an excess of at least one of the reactants so as to displace the equilibrium of the Equations 1 to 3 in the direction required to effect total transformation of the methyl mercaptan into dimethyl sulfide; the reactants are introduced into the said second stage in proportions which are especially suitable for this purpose.

This process requires that the compositions of the streams or currents which enter the second stage shall be constantly analyzed and that the proportions of these currents shall be modified as a function of variations in their composition, so that the excess of at least one of the reactants, which is necessary for displacing the reaction-equilibrium, is always maintained in the same pre-determined ratio in order to assist the displacement of the equilibrium in the desired direction.

An installation according to the invention comprises one or more primary reaction vessels, for the production of methyl mercaptan in a first working stage; apparatus for washing, absorbing and separating materials originating from the first stage; one or more secondary reaction vessels for carrying out a second working stage comprising the conversion of methyl mercaptan into dimethyl sulfide under the action of methanol and apparatus for regulating the rate of flow of methanol, reaching the secondary reaction vessel or vessels, and means for controlling the functioning of the said apparatus in response to variations in the composition of the streams of methanol and methyl mercaptan, respectively, which are supplied to the secondary vessel or vessels from the first working stage and are charged with impurities originating from the first working stage.

According to a preferred feature of the invention, the said apparatus for regulating the rate of flow of methanol is controlled by means of a programming device responsive to pulses supplied by two analysis devices which are associated with the inlets to secondary vessel or vessels and are responsive to the composition of the streams of reactants arriving at the said inlets; the analysis devices determine the compositions of these streams.

The said apparatus for regulating the rate of flow is preferably a proportionometer. Preferably, such as apparatus is also provided for regulating the quantities of crude methanol originating from the separation column and introduced into the said first reaction vessel.

Preferably, a column is interposed between the two reaction vessels for the two stages in which column absorption by the methanol of the products formed in the first stage takes place at low temperature. This column is preferably followed by a column in which there occurs "coarse" separation of the methanol and the lightest thio-compounds; these latter may then be degasified, if required. The methanol used in the absorption column is derived in part from the subsequent separation column; the remainder is fresh methanol.

In the drawing, 1 represents the first reaction vessel in which the first working stage of the process takes place, that is to say, the conversion of methanol into methyl mercaptan under the action of hydrogen sulfide. The gaseous products of the reaction pass into a condenser 13 and enter a washing column 2 through the base thereof, the said products meeting a counter-current of water at about 20° C. in said column. This water leaves the column at 90–95° C. The pressure in the column 2 is 3 bars absolute. A level regulator (not shown) makes it possible for water containing 10% by weight of methanol and traces of methyl mercaptan and dimethyl sulfide to leave the column by way of an automatic valve. The recycled washing water is cooled in a liquid-to-liquid exchanger 14 by means of cooling water at a temperature of +5° C.

The gaseous effluent from the column 2 passes into an absorption column 3, into the top of which is injected all the make-up methanol, cooled to −15° C.; slightly below the level at which this injection takes place, there is introduced a part of the methanol solution, cooled to −15° C., which is obtained in the subsequent separation stage. The condensation and absorption of the useful compounds, particularly methanol, methyl mercaptan and other sulfur derivatives, take place in the column 3. The gaseous effluent which leaves the column 3 is at −5° C., and its rate of flow is controlled by a pressure-regulating valve; this effluent is fed to a torch. The methanolic solution, with a high methyl mercaptan content, passes into a separation column 4, in which the major part of the methyl mercaptan which is separated is obtained at the top, the major part of the methanol and of the dimethyl sulfide being collected at the bottom. Separation is effected by heating to 110° C. under a pressure of 5.5 bars absolute. The distillate, a part of which is recycled, is degasified in a degasifying tower 5 before the remainder passes to the reaction vessel 7. The degasified hydrogen sulfide is returned to the reactor 1. The crude solution of methanol which is obtained is partly recycled to the absorption column 3, while the remainder is used in the reaction vessels 1 and 7.

These two streams of methanol and methyl mercaptan, respectively, both contain impurities; the methanol is accompanied by methyl mercaptan, dimethyl sulfide and water; the methyl mercaptan contains dimethyl sulfide, methanol, hydrogen sulfide and water.

The major part of the crude methyl mercaptan and a part of the crude methanol are combined in the second reaction vessel 7. A reservoir 6, acting as a reserve supply, is interposed in the path by which the crude methanol passes to the second reaction vessel 7. A device 15 (a proportionometer, for example) regulates the proportions of crude methanol entering the vessel 7, as a function of:

(a) The proportion of methanol in the stream of crude methanol and in the stream of crude methyl mercaptan which pass into the vessel 7;

(b) The proportion of methyl mercaptan in the stream of crude methyl mercaptan and in the stream of crude methanol;

(c) The excess of one of the reactants which is necessary in order to displace the equilibrium of the reaction towards the formation of dimethyl sulfide.

A device 15′ (a proportionometer, for example) regulates the proportions of crude methanol returned from the column 4 to the vessel 1.

The gaseous effluent leaving the reaction vessel 7 passes into a column 8 where it is cooled by washing with water, the principle of the column 8 being similar to that of the column 2. At 10% aqueous solution of methanol is withdrawn from the bottom of the column 8. The "heads," at 60° C. are passed into a combined condenser and decanting device 9, 10 which is cooled with water at +5° C. The gaseous phase is discharged to a torch by way of a pressure-regulating valve. The liquid phase is separated into an aqueous layer, which is discharged through a level-regulating valve, and a lighter organic phase; the latter is passed to an extractive distillation column 11 in which it is subjected to distillation and washing with water, this having the effect of destroying the methanol/dimethyl sulfide azeotrope. The dimethyl sulfide recovered contains some light impurities, including methyl mercaptan to the extent of about 1 to 2%. This methyl mercaptan is recovered at the top of a final purification column 12 and is returned to the stream of crude methyl mercaptan entering the vessel 7. The pure dimethyl sulfide obtained at the base of the column 12 is passed into an intermediate storage tank 16.

Analysis devices (not shown) are associated with the conduits through which the crude methyl mercaptan and the crude methanol are delivered to the vessel 7. The purpose of these analysis devices is to determine, respectively, the composition and rate of flow of the stream of crude methyl mercaptan and the composition of the stream of crude methanol leaving the column 4. These data are transmitted to a programming device, thus making it possible so to regulate the rate of flow of the stream of crude methanol that the quantities of the reactants which react together are such that the reaction product of this stage does not contain more than 5% of methyl mercaptan.

The process of the invention will now be further described with reference to one specific example thereof.

EXAMPLE

The process is carried out using a primary reactor (1 in the drawing) in which the temperature is kept between 300° C. and 350° C., and preferably at 330° C., and the pressure is kept at 2.5 bars absolute. The catalyst employed is aluminium oxide containing 3.5% of $Na_2O$. The secondary reactor 7 contains pure $Al_2O_3$; the temperature y is from 300° to 350° C., and preferably 330° C., and the pressure is 2 bars absolute. Under these conditions, it is found that, in the second reaction vessel, the conversion of the methyl mercaptan leads to a dimethyl sulfide mixture containing less than 5% of methyl mercaptan, provided there is an excess of methyl alcohol between 20 and 100 mol percent, and preferably between 45 and 55 mol percent with respect to the methyl mercaptan.

The presence of dimethyl sulfide does not cause any difficulty; it is generally below 50% in the products entering the vessel, and most normally in the range from 4 to 12% with respect to the total number of mols of the substances entering the reactor; in particular, it may be between 6 and 9%.

In the first working stage, 1306 kg./h. of hydrogen sulfide and 958 kg./h. of crude methyl alcohol enter the vessel 1. Of the said supply of 1306 kg./h. of hydrogen sulfide, 153 kg./h. originates from the degasifying stage 5 and 1153 kg./h. is pure hydrogen sulfide. The crude methyl alcohol originates from the base of the separation column 4. The molar composition of this crude alcohol is 87.3% of $CH_3OH$, 0.72% of methyl mercaptan, 10.05% of dimethyl sulfide and 1.97% of water.

2264 kg./h. of gaseous product pass from the vessel 1 into the washing column 2; they are partially cooled beforehand in the vane-type heat exchanger 13. 5000 kg./h. of water at 20° C. pass into the column 2 in counter-current with the gas. 5424 kg./h. of washing water are collected at the base of the column 2. About 424 kg./h. of this solution are withdrawn, the remainder being recycled into the column 2. The solution which is withdrawn is generally treated in an independent installation, in order to recover the methanol.

1840 kg./h. of gas-liquid mixture are introduced into the absorption column 3. 3216 kg./h. of methanol flow in counter-current in this column of which 1300 kg./h. are fresh methanol and 1916 kg./h. are 87.3%, methanol collected from the bottom of the column 4, the composition being as set out above.

4324 kg./h. of methanolic solution with a high content of methyl mercaptan pass into the separation column 4. Separation is effected by heating the solution to 110° C. at 5.5 bars. The distillate is degasified in the reservoir 6. 153 kg./h. of hydrogen sulfide are returned to the reaction vessel 1, and 668 kg./h. of crude methyl mercaptan containing in molar proportions 1.3% of $H_2S$, 77.9% of $CH_3SH$, 5.4% of $CH_3SCH_3$, 4.2% of $CH_3OH$ and 11.2% of $H_2O$ enter the reaction vessel 7. 3503 kg./h. of methanol, of which the molar composition is given above, are obtained at the base of the column 4. Of this 1916 kg./h. is introduced into the column 3, 958 kg./h. into the vessel 1 and 629 kg./h. flow towards the vessel 7. The reservoir 6 serves as a buffer store.

The required quantity of crude methyl mercaptan is determined in the following manner. Let $Q_1$ be the rate of flow of the stream of crude methyl mercaptan entering the reaction vessel 7 and $a$ and $b$ the molar quantities of methyl mercaptan and methanol contained in the said crude methyl mercaptan; $Q_1$, $a$ and $b$ are determined by analysis apparatus (not shown). The composition of the stream of high methanol content leaving the reservoir 6 is also established. Let $x/y=n$ be the ratio of the number of mols $x$ of methyl mercaptan to the number of mols $y$ of methanol in the said stream of crude methyl mercaptan. Let A indicate the ratio between methyl mercaptan and methanol necessary in the reaction medium for a given catalyst, a given temperature and a given pressure, in order that there shall be at least 5% of methyl mercaptan in the products of the reaction. If B is the number of mols of methyl mercaptan which have not reacted per mol of methyl mercaptan introduced into the second stage, then:

$$(a+x)(1-B):(b+y)=A \quad (I)$$

$$x:y=n \quad (II)$$

in which A, B, $a$, $b$, $n$ are known from the control analyses which are carried out continuously, thus enabling $x$ and $y$ to be obtained.

It is then easy, knowing the molar composition of the methanol-rich stream, to deduce therefrom the quantity to be introduced in order to ensure the necessary proportions for obtaining dimethyl sulfide which is practically free from methyl mercaptan.

Thus, in the case given by way of example, in which:

$a=11.68$
$b=0.62$
$n=0.008=$ratio between number of mols of methyl mercaptan and number of mols of methanol in the methanol-rich stream: 0.72/87.30.
$A=0.70$
$B=0.03$ there is obtained, by application of the two Formulae I and II:

$y=15.69$
$x=0.12$

The analysis indicated above, having given 87.3% for the content of methanol in the methanol-rich stream, it is seen that $y=15.69$ mols of methanol corresponds to $(100 \times 15.69):87.30=17.98$ mols of material rich in methanol.

The quantity of $Q_2$ of the methanol-rich material introduced into the vessel 7 is thus determined in the following manner (given that 48.1, 62.1, 21.3 and 18 are the respective molecular weight of $CH_3SH$, $CH_3SCH_3$, $CH_3OH$, $H_2O$):

$48.1 \times (0.72 \times 17.98):100=6.3$ kg./h. of $CH_3SH$
$62.1 \times (10.05 \times 17.98):100=112.4$ kg./h. of $CH_3SCH_3$
$32.1 \times (87.30 \times 17.98):100=503.9$ kg./h. of $CH_2OH$
$18 \times (1.93 \times 17.98):100=6.3$ kg./h. of $H_2O$ $Q_2=628.9$ kg./h.

On the other hand, the quantity $Q_3=958$ kg./h. of crude methanol, which returns to the reaction vessel 1, is determined so that the reactions in the vessel 1 favor to the maximum extent, the formation of methyl mercaptan. The formation of dimethyl sulfide is of the order of 5 to 8% by weight, relatively to the reaction medium in this vessel (in this example: about 113 kg./h. for 2264 kg./h. of reaction mixture, i.e., approximately 5%), when 1.6 mols of $H_2S$ are injected into the reactor in the presence of 1 mol of methanol. 1297 kg./h. of the reaction product originating from the vessel 7 pass into a cooling tower 8 similar to the column 2. 3500 kg./h. of water at 20° C. are introduced from the top into the tower 8, and 150 to 200 kg./h. of aqueous solution with 10% of methanol (actually 172 kg./h.) are withdrawn at the bottom at 90° C., 3500 kg./h. thereof being recycled. This tower 8 has the advantage of suddenly cooling the gases and stopping the major part of the methanol. The products collected at the top at 60° C. are sent into the combined condenser and decanter 9, 10 and cooled with water to 5° C. The gaseous phase, containg 7 kg./h. of $H_2S$, 30 kg./h. of methyl mercaptan and 10 kg./h. of dimethyl sulfide is evacuated towards the torch by a pressure regulator. Two liquid phases are separated: an aqueous phase containing 75 kg./h. of water, 13 kg./h. of methanol and 3 kg./h. of dimethyl sulfide and an organic phase containing 830 kg./h. of dimethyl sulfide, 9 kg./h. of methyl mercaptan, 140 kg./h. of methanol and 3 kg./h. of water. This organic phase is subjected to extractive distillation in the column 11 into which 1000 kg./h. of water are injected at the top. At the bottom of the column there are collected 1140 kg./h. of solution containing 1000 kg. of water, 130 kg. of methanol and 10 kg. of dimethyl sulfide.

842 kg./h. of dimethyl sulfide containing 97.4% of dimethyl sulfide, 1.1% of methyl mercaptan, 1.2% of methanol and 0.3% of water are introduced into a final purification column 12. At the top of this column there are obtained 25 kg./h. of vapors containing 9 kg. of methyl mercaptan, 10 kg. of dimethyl sulfide, 5 kg. of methanol and 1 kg. of water. These vapors are generally recycled towards the second phase reactor.

At the bottom of the column, 817 kg./h. of dimethyl sulfide are obtained containing 99.15% of dimethyl sulfide, 0.6% of methanol and 0.25% of water. They are sent to the storage reservoir 16. Thus, only 10 kg./h. of dimethyl sulfide corresponding to about 1.25% of the dimethyl sulfide treated in the final purification stage are entrained by the methyl mercaptan.

It will be clear that the invention is not limited to the details which have been described and that it is capable of numerous variations without thereby departing from the scope of the invention as defined by the appended claims. Thus, an analysis device can be placed at the outlet of the vessel 7 to initiate the shutting down of this reactor, if for example, because of aging of the catalyst, the proportion of methyl mercaptan in the effluent leaving the reactor 7 cannot be kept to a level below 5%. The buffering reservoir 6 would enable the first part of the installation to continue to operate, the reflux from the tower 5 then being complete.

The invention having been thus described, what is claimed as new and desired to be secured by Letters Patent is:

1. In a two-stage process for the production of dimethyl sulfide which comprises as a first stage reacting methanol with hydrogen sulfide in the presence of an aluminum catalyst to obtain methyl mercaptan and as a second stage reacting the methyl mercaptan thus obtained with methanol in a proportion of one mole of methyl mercaptan to from 1 to 2.5 moles of methanol in the presence of an aluminum catalyst to obtain dimethyl sulfide, the improvement which comprises carrying out both reactions at a temperature in the range of 300 to 350° C.

2. The process of claim 1, wherein both reactions are carried out at a pressure in the range from 1.5 to 3.5 bars absolute.

3. The process of claim 2, wherein the aluminum catalyst used in the first stage is $Al_2O_3$ to which there is added a small proportion of $Na_2O$, and aluminum catalyst used in the second stage is substantially pure $Al_2O_3$.

References Cited

UNITED STATES PATENTS 2,816,146   12/1957   Doumani _____ 260—609

CHARLES B. PARKER, Primary Examiner

D. R. PHILLIPS, Assistant Examiner